United States Patent Office 2,923,094
Patented Feb. 2, 1960

2,923,094

METHOD OF TREATING CUT FLOWERS AND PRODUCT THEREFOR

Wayne L. Ryan, Omaha, Nebr.

No Drawing. Application May 8, 1957
Serial No. 657,720

11 Claims. (Cl. 47—58)

This invention relates to a method of treating cut flowers and product therefor, and more particularly, to a method and product that enhance and preserve cut flowers.

Although cut flowers are generally appreciated in any stage of their development, they are usually considered most attractive when in full bloom. Thus, growers, florists and users such as homemakers, have been faced with the problem of having cut flowers or near full bloom in full bloom at the proper time. The problem is further complicated because it is usually desirable to have the flowers in full bloom for an extended period, the longer the period the more desirable. Although it is possible to approach this desirable condition to a certain extent by advance notice to the grower or florist, such is not usually possible. Thus it is not uncommon for a user to buy cut flowers as buds and then hope that they will bloom in time for their intended use as a floral display. Many homemakers, for example, desire to use cut flowers as a table centerpiece. If the cut flowers purchased for this purpose are already in full bloom, there is always the chance that they will wilt prior to the time they are used as a centerpiece. If they are purchased as buds there is always the possibility that they will not develop in time to provide the desired floral arrangement. Further, some buds might develop while others will not which then also destroys the desired arrangement. Still further, it is usually impracticable for the homemaker to resort to extraordinary devices and expedients to bring flowers into proper bloom and maintain them in that condition when she is involved in other preparations.

The problem of controlling blooming and failure of wilting is not localized merely at the consumer level, but extends over the entire period from the time the flowers are first cut. The grower must during time of storage and shipment inhibit blooming as much as possible without causing the flowers to wilt. The same problem faces the florist. At the same time, the procedures employed by the florist to safeguard his cut flowers must not conflict with any procedures employed by the grower. It is therefore desirable that means be provided whereby cut flowers can be maintained in a pre-bloom state from the time they are cut up to the time they are purchased and then fairly rapidly developed into full bloom. It is equally desirable in some instances that cut flowers be maintained and preserved against either premature development or wilting, either by the seller or by the buyer, or both.

The complexity of the problem is shown by the requirement that a cut flower preservative should:

(1) Inhibit bacterial and fungal activity;
(2) Improve transpiration (adequate water take-up);
(3) Decrease the rate of respiration of the flower so as to maintain endogenous food reserves.

The achievement of these desirable results is difficult since many of the means promoting the achievement of one result operate to prevent the achieving of another result. For example, a composition used to inhibit bacterial and fungal activity may in itself subvert the entire purpose of its use by being toxic to the flower. It may do this by overly decreasing the rate of respiration of the flower so that it wilts.

It is an object of my invention to provide a novel method and product for treating cut flowers that overcomes the disadvantages and problems set forth above. Another object is to provide a method and product that rapidly accelerates the blooming or near-blooming of cut flowers. Yet another object is to provide a method and product that accelerates the blooming of cut flowers and preserves the bloomed flowers for a substantial period thereafter. Still another object is to provide a method and product for preserving and enhancing cut flowers up to the time they pass into the hands of a user. A still further object is to provide a cut flower preservative and method of using the same which substantially achieves the desirable results set forth above. Other objects and advantages of my invention will be seen as this specification proceeds.

In one embodiment of my invention, I achieve acceleration of the blooming of buds on cut flowers by maintaining the stems of cut flowers in an aqueous medium having a pH outside the range 4–6 for a period necessary to cause blooming of the buds. Ordinarily this period is of fairly short duration and generally not in excess of twenty-four hours. It is to be appreciated that the desirable results of my invention are not achievable through the use of plain water despite the fact that plain water ordinarily has a pH of about 7, and is thus outside the indicated range. Maintaining the stems of cut flowers in plain water does not produce the desirable results of my invention since the pH of the water is soon altered downwardly into the range of 4–6 by virtue of the saps and juices exuding from the flower stem which possess a pH in the range 4-6.

Although the mechanism by which this embodiment of my invention operates is imperfectly understood, it is believed that the maintenance of the stems of cut flowers in an aqueous solution having a pH outside the range of 4–6 results in an increase in respiration of the flower. When the pH returns to the "normal" range of 4–6, the rate of respiration decreases.

In this embodiment of my invention I prefer to employ a pH of about 7 although satisfactory results have been obtained using a pH in the range 2–3. I find that somewhat more consistent results can be obtained when the pH adjustment is made toward the alkaline side rather than toward the acid side.

To effectuate the purposes of my invention and to preserve the cut flowers when the pH is in the range 4–6 as, for example, when blooming has occurred, I find it desirable to subject the stem of the cut flowers to a preservative composition which is effective to decrease the rate of flower respiration in the pH range 4–6. For this purpose I prefer to employ a composition which is also effective in realizing other of the advantages and desirable features set forth above, such as increasing the rate of transpiration and inhibiting bacterial and fungal activity. For this purpose I find silver containing compounds satisfactory. Relatively low concentrations of such compounds have proved useful, particularly in the range of 0.0001% to 0.1%. I have found that increasing the concentration of the silver containing compound results in additional decreases of respiration but that within the range specified the decreases in respiration are not of the order found to be toxic to the cut flower. Although most forms of silver, particularly colloidal silver, are useful in a preservative composition, I prefer to use a stable form (not easily reduced by light) such as silver oxide or silver iodate. Of these, I prefer silver iodate. To further stabilize silver containing compounds and increase their solubility, I find it advantageous to employ a chelating agent such as ethylenediamine tetraacetate. If such an agent is employed, it is preferable to add the agent to the solution prior to the addition of the silver containing compound. For most purposes, a concentration in the final solution of 0.01 to 0.005% of the chelating agent has been found adequate.

Silver containing compounds have been found effective in inhibiting bacterial and fungal activity, decreasing the rate of respiration and improving transpiration. I believe the silver containing compound improves transpiration by toughening the fibre of the plant and preventing maceration of the stem. Further improvement in transpiration can be achieved by various alums such as aluminum chloride, aluminum potassium sulfate and aluminum sulfate. When such additional fibre toughening is desired, concentrations in the final solution in the range of 0.01 to 0.1% have been found suitable.

When silver containing compound is employed in the embodiment of my invention which promotes accelerated blooming of buds, I have found it desirable to add a buffering type material. Preferably this material can take the form of a salt of a strong base and a weakly dissociated acid. Among the salts found satisfactory are sodium perborate and the sodium salts of citric and succinic acid. When it is desired to both accelerate the blooming of buds and preserve the cut flowers thereafter, I find it desirable to incorporate a nutrient material into the aqueous solution in which the stems of the cut flowers are maintained. Such nutrient materials may take the form of carbohydrates, a convenient form being sucrose. Other satisfactory nutrients are lactic acid, citric acid, pyruvic acid, succinic acid or the sodium salts of these acids. If for any reason it is considered undesirable to employ a silver containing compound in a composition that promotes accelerated blooming of buds and preservation thereafter, I have obtained satisfactory results by substituting streptomycin and sodium salicylate for the silver containing compound. Optimal results in such an instance are achieved where the concentration of streptomycin in the final solution is one hundred to one-thousand micrograms per liter of solution and the sodium salicylate 0.01 to 0.1 grams per liter of solution.

A formulation for accelerating the blooming of buds and preserving cut flowers thereafter can be provided in many forms. Among these forms are included tablets, capsules, powder, concentrated liquid and the like. Especially desirable results and ease of use of the above described compositions can be obtained when the composition is impregnated in an absorbent material. Upon immersion of the absorbent material in an aqueous solution surrounding the stems of cut flowers, the composition desorbs and provides the desired preservative mixture. A suitable absorbent material for this purpose is an absorbent paper like blotting paper impregnated with a concentrate of the composition. In such a case it is possible to impregnate the absorbent material with a 10–100 fold concentrate of the medium and then dry the absorbent material. The absorbent material provides the proper amount of ingredients since it can be placed at the bottom of the flower-containing vase adjacent the ends of the cut flower stems.

When it is desirable to preserve flowers after they are cut, but prior to the time of blooming, satisfactory results are obtained by incorporating a formulation of the character described above into a water soluble wax-like material that is solid at room temperature. Such materials can conveniently take the form of polyethylene glycols. The suspension of the composition in the wax-like material can be applied to the stems of cut flowers by dipping, spraying, or other suitable procedures. Such a coating reduces loss of water by the flower and thereby reduces the rate of wilting. It has been found to keep the cut end of the stem fresh which improves transpiration while at the same time is toxic to all microorganisms on the stem. The flowers, when put in water, are stripped of the coating and the water becomes a preservative solution containing nutriment and disinfectant which further preserves the flower. The coating employed here can be applied throughout a substantial length of the stem to stiffen the same, which eliminates the need on the part of retail florists to wire the heads of the flowers in an upright position in order to keep the heads from drooping. This also eliminates unsightly wires. At the same time, the coating protects the flower stems from mechanical injury. Of the wax-like materials useful in connection with preserving flowers prior to use, I have found suitable those which, when combined with preservative formulations, have melting-points and consistencies at room temperature corresponding to that of paraffin (M.P. 39° C.). I have also found various cellulosic compositions suitable, such as a solution of 15 centipoise methylcellulose, containing up to about 0.1% of a silver compound. The melting-point of the mixture of the wax-like material and preservative composition can be varied by varying the amount of water included therewith. However, I prefer to adjust the amount of water incorporated into the wax-like material to a value that maintains the melting-point substantially near that of paraffin, namely, 39° C.

My invention will be further explained in conjunction with the following examples:

*Example I*

An aqueous mixture containing 0.001% silver chloride and .004 of sodium borate was provided. The pH of this solution was measured and found to be about 7.0. Bud roses were provided and the stems placed in the silver chloride-sodium perborate aqueous mixture and the buds were found to have bloomed within a few hours. Within twenty-four hours the pH of the solution had dropped to below 6.0.

Comparison tests wherein the same type of cut flowers were placed in identical aqueous mixtures demonstrated that substantially longer times were required for blooming of buds when the pH was adjusted prior to insertion of the flower stems to within the range of pH 4–6.

*Example II*

Various organisms were isolated from roses. The bacterial microorganisms were placed in a nutrient agar and the mold or fungal organisms were placed in Sabouraud dextrose agar. The bacteria found on the roses were identified as gram negative organisms belonging to the genus Erwinia. Cultures of the bacteria were then provided in sufficient quantity to test three groups of inhibiting agents, the groups including antibiotics, antiseptics and silver compounds. The organism was found to be resistant to all concentrations of the commercially available antibiotics with the exception of streptomycin, terramycin and chloromycetin. Ten micrograms per millimeter of these three antibiotics was found sufficient to kill the infecting organisms. Of the antiseptics, alkyldimethyl-benzylammonium chloride, cetylpyridinium chloride, hexylresorcinol, dinitrophenol and methenamine were ineffective to kill the bacterial microorganisms when the antiseptics were used in concentrations up to 0.1%. Hydrogen peroxide was found to inhibit bacterial growth at a concentration of 0.01%, sodium hypochlorite and chloramine T at a concentration of 0.1%. Such concentrations, however, are considered injurious to the flower in that premature wilting is produced. 0.001% of each of the following silver containing compounds were found to inhibit the growth of the microorganisms: colloidal silver, silver acetate, silver chloride and silver iodate.

Two types of fungi were isolated on the Sabouraud agar and these were found resistant to all of the antiseptics but none of the silver compounds. Confirmation of this data was obtained by immersing stems of flowers in all of the antiseptics and after three days repeating the isolation experiments. Microorganisms were found on all of the stems. Similar confirmations performed using the silver containing compounds resulted in absence of the organisms.

*Example III*

The following formulation was prepared in a liter of water:

| Ingredient: | Concentration |
| --- | --- |
| Magnesium sulfate | gram 0.1 |
| Sodium borate | do 0.004 |
| Citric acid | do 1.0 |
| Succinic acid | do 1.0 |
| Sucrose | do 1.0 |
| Silver iodate | do 0.01 |

Two types of commercially available cut flower preservatives were also provided. Four vases were provided, one of which contained the foregoing preparation, two others the commercially available preservative preparations, and the fourth, plain water. Into each vase was introduced a bouquet which included roses, jonquils, iris, chrysanthemums, orchids, carnations and snapdragons. The attention was focused primarily on the roses, since these are considered most difficult to maintain. Shortly after immersion of the stems of the cut flowers in the four vases, the pH of each of the solutions was measured and found to be in the range of 4–6. The flowers were examined from time to time and the flowers in the vase containing my formulations as set forth above were found to last about twice as long as those having their stems immersed in the commercially available preparations, and three times as long as those in water.

*Example IV*

An experiment similar to that described in Example III was performed but wherein the formulation set forth was modified by replacing the silver iodate with 100 micrograms of streptomycin and 0.01 gram of sodium salicylate. Similar results were obtained. The same superior results with flowers immersed in a formulation according to my invention were obtained when the concentration of streptomycin was 1000 micrograms and that of sodium salicylate 0.1 gram.

*Example V*

The following preparation was prepared in a liter of water:

| Ingredient: | Concentration |
| --- | --- |
| Magnesium sulfate | gram 0.1 |
| Sodium borate | do 0.04 |
| Citric acid | do 5.0 |
| Succinic acid | do 5.0 |
| Sucrose | do 5.0 |
| Silver iodate | do 0.1 |

The pH of the foregoing aqueous mixture was adjusted to about 7.0 with sodium citrate. Solutions of two commercially available preservative compositions were provided. Four vases were provided, one having the foregoing formulation therein, two with the commercially available preservative preparations, and one with plain water. Bud roses were placed in each of the four vases. The buds in the vase containing the formulation described above bloomed within about three hours, while those in the other three vases took a considerably longer time to bloom, in some cases not all of the buds being opened after twelve hours residence in the vases. After blooming, the roses in the vase containing the formulation described above were found to have longer lives before wilting than the roses in the other three vases.

*Example VI*

The formulation set forth in Example V was provided in one vase. A similar formulation but in ten milliliters of water rather than one liter was also provided. Both had pH's of about 7.0. This second formulation was placed in a vessel and a sheet of blotting paper immersed therein. After the blotting paper had absorbed all of the 10 milliliters of formulation, the blotting paper was placed in a desiccator. After evaporation of substantially all of the moisture from the blotting paper as determined by identical weights at spaced time intervals, the blotting paper was removed from the desiccator and placed in a vase containing a liter of water. Bud roses were introduced into each vase and throughout the blooming and life no appreciable difference was noted between the roses in the two vases.

The vase containing the blotting paper had the paper positioned at the bottom thereof, adjacent the cut ends of the stems of the rose buds placed in the vase. Such a blotting paper can provide a convenient surface for printing if desired so as to advertise floral goods. Alternatively, a plurality of blotting papers can be provided in a matchbook type holder wherein the holder itself is provided with advertising and the sheets are attached to the holder by weakened portions as by perforations.

*Example VII*

The ingredients of the formulation of Example V with the exception of water was provided in twenty milliliters of water. To one part of this mixture was added nine parts of melted polyethylene glycol having a molecular weight of 4,000. Polyethylene glycol with a molecular weight of 4,000 is sold under the trademark Carbowax by the Union Carbon & Carbide Company. The mixture of preservative and polyethylene glycol 4,000 had a melting-point of 39° C. and a consistency at room temperature corresponding to that noted in paraffin. Orchids were dipped into the melted mixture to a point adjacent the flower heads and thereafter removed and the suspension permitted to dry on the stems of the orchids. After standing in a cold room (about 50° F.) for two days, the orchids were removed and placed in a vase containing water. The coating dissolved from the stems in a short time and the flowers were maintained in a state of bloom for eight days. Cultures of stem scrapings after that period revealed the absence of all organisms of the character described above in Example II.

*Example VIII*

The formulation of Example V without water but containing amounts of ingredients producing a buffered pH of about 7, was provided. Three parts of this formulation was incorporated into seven parts of polyethylene glycol 6,000. Bud roses were sprayed with the melted formulation (melting-point about 39° C.). The roses were maintained in a cold room for several days, during which time they were mounted in a frame without any supporting wires and in which they stood erect. Thereafter they were removed from the cold room and placed in a vase containing water. After a short period the coating dissolved from the stems revealing them to be in unbruised condition. Shortly thereafter the bud roses bloomed and were maintained in a state of full bloom for several days. Thereafter, examination of cultures made from scrapings from the stem revealed the presence of none of the organisms described above in Example II.

The foregoing detailed description has been given for clearness of understanding only and no unnecessary limitations are to be inferred therefrom.

I claim:

1. In a method of treating cut flowers, the step of maintaining the stems of cut flowers in an aqueous medium having a pH outside the range 4–6 for a period necessary to cause blooming of buds by subjecting the stems to a preservative composition comprising silver iodate, said composition being effective to decrease the rate of flower respiration in the said pH range but substantially ineffective to decrease said rate outside said pH range.

2. In a method of treating cut flowers to accelerate the blooming of buds thereof, the step of maintaining the stems thereof in an aqueous medium including a pH change-inhibiting composition, said composition being effective to inhibit pH change of said medium by said stems into the range 4–6 for a period of less than about 24 hours to cause blooming of said buds.

3. The method of claim 2, in which the said composition comprises a silver-containing compound.

4. The method of claim 2, in which the said medium is fortified with a silver-containing material and an alkaline buffering material.

5. In a method of treating cut flowers to control the blooming of buds thereof, the steps of coating at least the bottom portions of the stems thereof prior to blooming with a water-soluble wax-like material, said material being solid at room temperature, dissolving said coating with an aqueous medium and thereafter maintaining said stems in an aqueous medium having a pH outside the range 4–6 for a period necessary to cause blooming of buds.

6. The method of claim 5, in which the said pH is achieved by fortifying said last mentioned medium with a composition resistive to pH change of said medium by said stems.

7. The method of claim 6, in which the said composition is dispersed in said wax-like material.

8. The method of claim 7, in which the said composition comprises a silver-containing compound whereby the stem-coated flowers are additionally preserved against bacterial degradation.

9. The method of claim 8, in which the silver-containing compound is present in an amount sufficient to provide a concentration thereof in said last-mentioned medium in the range of about 0.0001% to about 0.1%.

10. In a method of treating cut flowers shortly after cutting to preserve them in an unbloomed condition prior to use as a display and to adapt them for rapid blooming thereafter, the step of coating at least the bottom portions of the stems thereof with a wax-like material solid at room temperature having suspended therein a silver-containing compound.

11. The method of claim 10, in which the said wax-like material is a polyethylene glycol.

References Cited in the file of this patent

UNITED STATES PATENTS

| | | |
|---|---|---|
| 1,779,299 | Valentine | Oct. 21, 1930 |
| 1,909,013 | Ruzicka | May 16, 1933 |
| 1,956,908 | Neubert | May 1, 1934 |
| 1,978,201 | Heuer | Oct. 23, 1934 |
| 2,013,063 | Miller | Sept. 3, 1935 |
| 2,230,931 | Bussert | Feb. 4, 1941 |
| 2,567,929 | Fessenden | Sept. 18, 1951 |
| 2,614,039 | Hamner | Oct. 14, 1952 |
| 2,658,836 | Fessenden | Nov. 10, 1953 |

FOREIGN PATENTS

| | | |
|---|---|---|
| 954,317 | France | June 6, 1949 |
| 332,278 | Great Britain | July 17, 1930 |
| 592,709 | Great Britain | Sept. 26, 1947 |

OTHER REFERENCES

Publications: Grinstead, "Keeping Cut Flowers Fresh," published July 1924 in The Garden Magazine, vol. 39, page 343.

Chemical Abstracts (magazine), vol. 21, published 1927, page 4010, article, "The Internal Therapy of Plants."